United States Patent [19]

Oishi

[11] Patent Number: 4,604,671
[45] Date of Patent: Aug. 5, 1986

[54] MAGNETIC RECORDING TAPE CASSETTE

[75] Inventor: Kengo Oishi, Odawara, Japan

[73] Assignee: Fuji Photo Film Co., Ltd., Odawara, Japan

[21] Appl. No.: 517,281

[22] Filed: Jul. 26, 1983

[30] Foreign Application Priority Data

Jul. 28, 1982 [JP] Japan .................. 57-131503

[51] Int. Cl.$^4$ .................. G11B 15/32; G03B 1/04
[52] U.S. Cl. .................. 360/132; 242/198
[58] Field of Search .................. 360/132, 92–93; 242/197–201

[56] References Cited

U.S. PATENT DOCUMENTS

| 4,106,724 | 8/1978 | Higashida | 242/198 |
| 4,195,797 | 4/1980 | Okamura et al. | 242/199 |
| 4,288,048 | 9/1981 | Sieben | 242/198 |
| 4,470,560 | 9/1984 | Yoneya et al. | 242/198 |
| 4,513,929 | 4/1985 | Oishi et al. | 242/198 |

Primary Examiner—John H. Wolff
Assistant Examiner—David J. Severin
Attorney, Agent, or Firm—Gerald J. Ferguson, Jr.; Michael P. Hoffman; James E. Bryan

[57] ABSTRACT

A magnetic recording tape cassette having a casing and a pair of reels mounted for rotation in the casing for winding a magnetic recording tape therearound is provided with a braking member for preventing rotation of the reels in the unwinding direction while the cassette is not in use. The braking member comprises a body portion movable in the direction perpendicular to the line passing through the center of the reels back and forth with respect to the line between an operative position remote from the line and an inoperative position near the line, a pair of wing-like swinging portions integrally extending from the body portion on opposite sides thereof, and engaging hooks formed on the free end of the respective swinging portions to be engaged with gear teeth formed on the periphery of a flange of the reels. The swinging portions are resiliently urged to an engaging position in which the engaging hooks are brought into engagement with the gear teeth of the respective reels to prevent rotation of the reels in the unwinding direction. The body portion is normally held in the operative position by a counterforce exerted thereon against the resilient force urging the swinging portions through the engagement between the engaging hooks and the gear teeth. A pair of engaging pins are provided on opposite sides of the body portion to engage with the swinging portions to move them to a disengaging position in response to the movement of the body portion to the inoperative position.

3 Claims, 6 Drawing Figures

MAGNETIC RECORDING TAPE CASSETTE

BACKGROUND OF THE INVENTION

1. Field of the Invention

This invention relates to a magnetic recording tape cassette, and more particularly to a magnetic recording tape cassette provided with means for preventing the magnetic recording tape from slackening.

2. Description of the Prior Art

There has come into wide use a portable type video recording system comprising a video camera associated with a miniaturized video tape recorder using a magnetic recording tape cassette. However, conventional portable type video recording systems are not so handy as an 8 mm cine camera since the video camera and the video tape recorder are separate units. Therefore there is a great demand for a portable video recording system comprising a video camera having a video tape recorder built therein. The video camera of this type will be referred to as a "built-in" type video camera, hereinbelow.

In the magnetic recording tape cassette for the video tape recorder, the recording tape must be prevented from accidentally slackening due to vibrations or mishandling by the user. Otherwise, the danger arises that the slack part of the tape may possibly project from the tape drawingout opening of the cassette to be damaged or that the loading operation which is to be effected after the cassette is loaded in the system which uses the cassette, e.g., a video tape recorder, cannot be correctly effected. Thus, conventionally the cassette has been provided with a braking device which permits rotation of the reels in the winding direction (the direction in which each reel is rotated to wind up the magnetic recording tape therearound) but does not permit rotation of the reels in the unwinding direction (the direction in which each reel is rotated to unwind the magnetic recording tape thereon). The conventional braking device includes, in both the Betamax system and the VHS system, a plurality of relatively small components.

In order to highly miniaturize the recording tape cassette to be loaded in a video tape recorder which itself is highly miniaturized so that it can be built in the builtin type video camera, the braking system must also be miniaturized. When the small components constituting the braking device are further miniaturized, workability in assembling the cassette is lowered due to the need to assemble the plurality of very small components of the braking device, which adds significantly to the manufacturing cost of the cassette.

SUMMARY OF THE INVENTION

In view of the foregoing observations and description, the primary object of the present invention is to provide a magnetic recording tape cassette having a braking device which is relatively simple in structure and accordingly is easy to handle during assembly of the cassette.

The magnetic recording cassette of the present invention is characterized by having a braking member which is substantially of one piece and accordingly is easy to handle during assembly of the cassette even if the braking member is made very small in size. The braking member comprises a body portion movable in the direction perpendicular to the line passing through the centers of the reels back and forth with respect to the line between an operative position remote from the line and an inoperative position near the line, a pair of wing-like swinging portions integrally extending from the body portion on opposite sides thereof toward the flanges of the respective reels and an engaging hook formed on the free end of each swinging portion to be engaged with gear teeth formed on the periphery of the reels. The swinging portions are resiliently urged to an engaging position in which the hooks are brought into engagement with the gear teeth to prevent rotation of the reels in the unwinding direction. Engaging means is provided to be engaged with the swinging portions, in response to the movement of the body portion toward said line to the inoperative position, to swing them to a disengaging position in which the engaging hooks are released from the gear teeth overcoming the resilient force urging the swinging portions. The body portion is normally held in the operative position by a counterforce exerted thereon against the resilient force through the engagement between the engaging hooks and the gear teeth.

The engaging means may be in the form of a pair of engaging pins fixed to the bottom wall of the cassette casing on opposite sides of the body portion to abut against the respective swinging portions when the body portion is slid toward the line passing through the centers of the reels to the inoperative position. The engaging pins are preferred to be integral with the cassette casing in order to reduce the number of components constituting the cassette.

The braking member used in the present invention is substantially of one piece though a spring may be used to urge the swinging portions to the engaging position, if desired. Therefore, it is easy to handle during assembly of the cassette even if its size is very small, which contributes to reduction of the manufacturing cost of highly miniaturized recording tape cassette.

DESCRIPTION OF THE PREFERRED EMBODIMENTS

Figure 1:
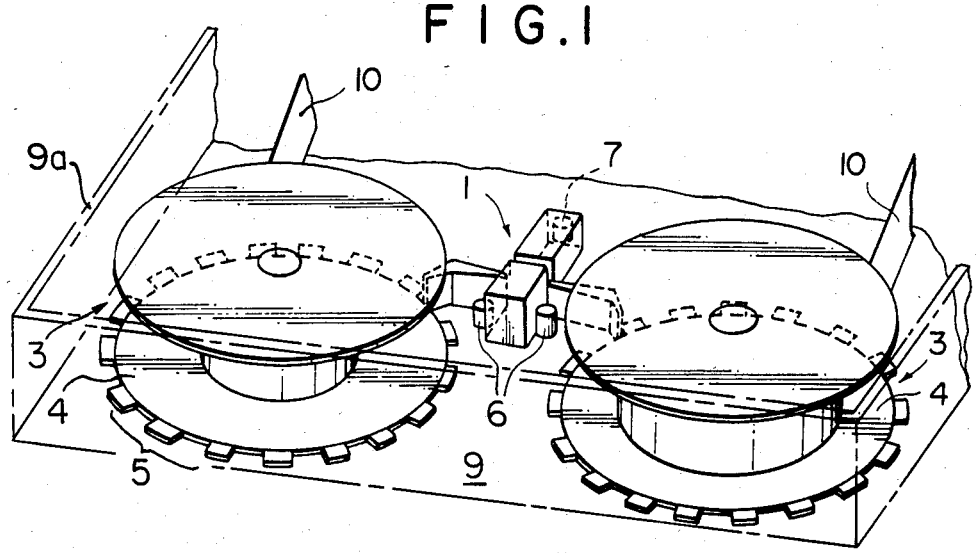
FIG. 1 is a fragmentary perspective view showing the inside of a magnetic recording tape cassette in accordance with an embodiment of the present invention.

In FIG. 1, which shows a magnetic recording tape cassette in accordance with an embodiment of the present invention, a magnetic recording tape 10 is wound around a pair of reels 3 each having an upper flange and a lower flange 4. The lower flange 4 of each reel 3 is provided with gear teeth 5 over the entire periphery thereof. A braking member 1 is disposed near the lower flange 4 of each reel 3 between the reels 3, and on the same side as the unwound part of the tape 10 with respect to the line passing through the centers of the reels 3.

Figure 2:
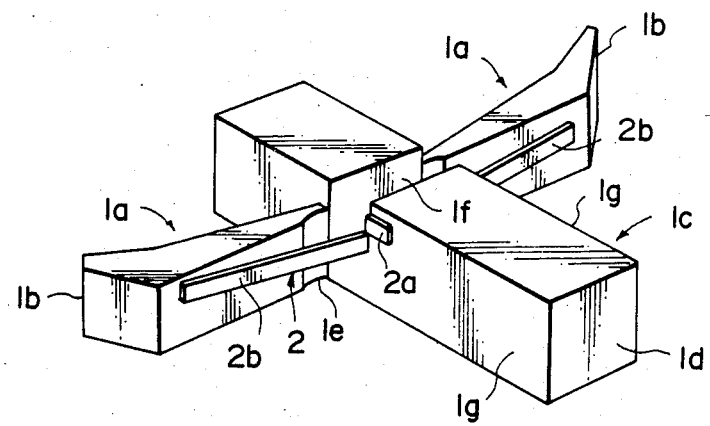
FIG. 2 is an enlarged perspective view of the braking member employed in the cassette of FIG. 1.

As shown in detail in FIG. 2, the braking member 1 comprises a body portion 1c in the form of a rectangular post which extends perpendicularly to the line passing through the centers of the reels 3 in the middle between the centers of the reels 3 and is slidable between an operative position and an inoperative position perpendicularly to the line, and a pair of wing-like swinging portions 1a extending integrally from the body portion 1c on opposite sides thereof toward the lower flange 4 of the respective reels 3. The wing-like swinging portions 1a can be swung with respect to the body portion 1c between an engaging position in which they are brought into engagement with the gear teeth 5 of the respective reels 3 and a disengaging position in which they are removed from the gear teeth 5, and are urged toward the engaging position by a back-up leaf spring 2 as will be described in more detail hereinbelow. The free end portion of each swinging portion 1a is bent toward the center of the corresponding reel 3 and forms an engaging hook 1b adapted to be engaged with the gear teeth 5 of the reel 3.

A stopper 7 projects from the bottom wall 9 of the cassette casing (not shown) to abut against the end face 1d of the body portion 1c remote from the line passing through the centers of the reels 3. The end face 1d also serves as an abutment surface against which a releasing member (not shown) abuts to push the body portion 1c toward the line passing through the centers of the reels 3 to slide the braking member 1 to the inoperative position, the releasing member being inserted into the cassette from outside thereof. The body portion 1c is further provided with a recess 1f at an intermediate portion thereof and said backup leaf spring 2 is held in the recess 1f. The leaf spring 2 comprises a support portion 2a and a pair of arms 2b extending therefrom in opposite directions. The support portions 2a includes a pair of rearwardly bent arm portions which grip the body portion 1c of the braking member 1 therebetween to hold the spring 2 on the body portion 1c. The arms 2b of the leaf spring 2 abut against the rear face of the respective swinging portions 1a of the braking member 1 to urge them toward the engaging position in which the engaging hook 1b of each swinging portion 1a is brought into engagement with the gear teeth 5 of the corresponding reel 3.

A pair of engaging pins 6 project from the bottom wall 9 of the cassette casing 9a on opposite sides of the body portion 1c of the braking member close to the side surfaces 1g thereof. When the body portion 1c is slid to the inoperative position, the engaging pins 6 engage with the respective swinging portions 1a to push them rearwardly with respect to the body portion 1c toward the disengaging position in which the engaging hook 1b of each swinging portion 1a is disengaged from the gear teeth 5. The engaging pins 6 also serve to guide the sliding movement of the body portion 1c. The wall thickness of the junction between each swinging portion 1a and the body portion 1c of the braking member 1 is thinned as indicated at 1e so that the swinging portion 1a can be swung with respect to the body portion 1c by a relatively small force. It is preferred that the braking member 1 be made of plastic materials of low brittleness such as polypropylene and polycarbonate so that the swinging portions 1a are not removed from the body portion 1c due to fatigue of the material after a number of swinging movement by the swinging portions 1a.

Figure 3A:
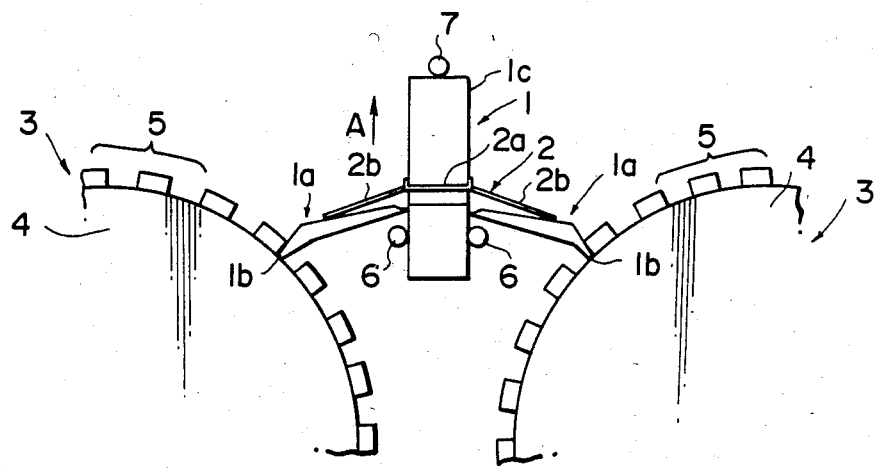
FIG. 3A is a fragmentary plan view of the braking member and the reels employed in the cassette of FIG. 1 when the braking member is in the operative position.
Figure 3B:
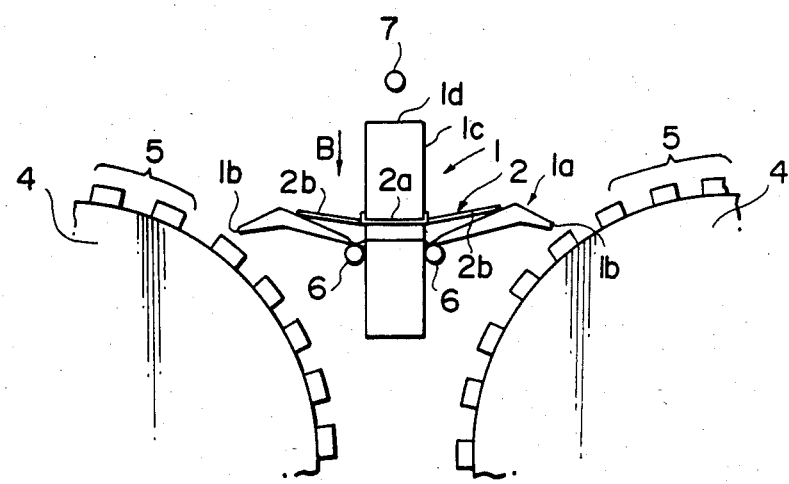
FIG. 3B is a view similar to FIG. 3A but when the braking member is in the inoperative position.

FIG. 3A shows the condition when the braking member 1 is in the operative position in which it prevents rotation of the reels 3 in the unwinding direction (the clockwise direction in the case of the left reel 3 and the counterclockwise direction in the case of the right reel 3) but permits rotation of the reels 3 in the winding direction, while FIG. 3B shows the condition when the braking member 1 is in the inoperative position in which the reels 3 are released from the braking member 1 to freely rotate.

When the braking member 1 is not pushed by the releasing member, the swinging portions 1a are swung toward the line passing through the center of the reels 3 to the engaging position in which the engaging hooks 1b are engaged with the gear teeth 5 of the respective reels 3 under the force of the leaf spring 2 as shown in FIG. 3A. At this time the body portion 1c of the braking member 1 is held with the end face 1d abutting against the stopper 7 by the counterforce exerted thereon in the direction of the arrow A against the force of the spring 2.

Figure 4A:
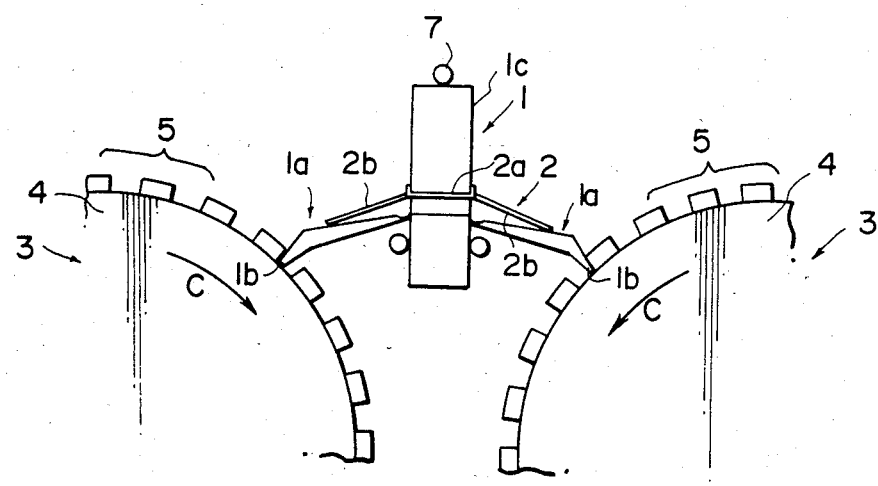
FIGS. 4A and 4B show the operation of the braking member when it is in the operative position.
Figure 4B:
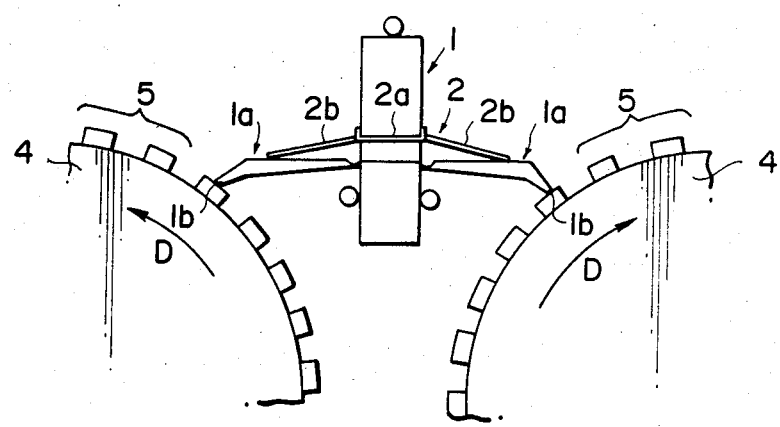

When the braking member 1 is in the operative position and the engaging hooks 1b are engaged with the gear teeth 5, rotation of the reels 3 in the unwinding direction indicated by the arrows C in FIG. 4A is prevented by the engagement between the hooks 1b and the gear teeth 5 as can be seen from FIG. 4A, while rotation of the reels 3 in the winding direction indicated by the arrows D in FIG. 4B is permitted since the swinging portions 1a can be swung overcoming the force of the spring 2 to disengage the hook 1b from the teeth 5 as can be seen from FIG. 4B.

When the releasing member is inserted into the cassette to push the braking member 1 toward the line passing through the centers of the reels 3 in the direction of the arrow B in FIG. 3B to the inoperative position, the swinging portions 1a abut against the respective engaging pins 6 and are swung away from the reels 3 whereby the hooks 1b are disengaged from the gear teeth 5. Thus the reels 3 are released from the braking member 1.

The relative amount of the swinging movement of the swinging portions 1a to the sliding movement of the body portion 1c may be adjusted by adjusting the space between the side surfaces 1g of the body portion 1c and the engaging pins 6. Further by thickening the hinge portions of the swinging portions 1a to give it resiliency, the leaf spring 2 urging the swinging portions 1a toward the engaging position can be dispensed with.

I claim:

1. In a magnetic recording tape cassette comprising a casing, a pair of reels which are mounted for rotation in the casing and around which a magnetic recording tape is wound, said tape including an unwound portion, said reels being rotatable in a winding direction and an unwinding direction, and a braking device for preventing rotation of said reels in said unwinding direction, said reels having a flange provided with gear teeth on a periphery thereof, the improvement wherein said braking device comprises:

a braking member having a body portion movable in a direction perpendicular to a line passing through the centers of said reels back and forth with respect to said line between an operative position remote from said line and an inoperative position near said line, said braking member being disposed on the same side as said unwound portion of said tape with respect to said line;

a pair of wing-like swinging portions integrally extending from said body portion on opposite sides thereof toward the flanges of the respective reels;

an engaging hook formed on a free end of each swinging portion to be engaged with said gear teeth of the corresponding reel, said swinging portions being resiliently urged to an engaging position in which said engaging hooks are brought into engagement with said gear teeth; and engaging means for engaging with said swinging portions in response to movement of said body portion toward said line to the inoperative position to swing said swinging portions to a disengaging position in which said engaging hooks are released from said gear teeth overcoming the resilient force urging said swinging portions, said body portion normally being held in the operative position by a counter force exerted thereon against the resilient force through the engagement between said engaging hooks and said gear teeth by which engagement, said reels are prevented from rotating in said unwinding direction.

2. A magnetic recording tape cassette as defined in claim 1, in which said operative position of said body portion is defined by a stopper provided in said casing to abut against an end-face of said body portion remote from said line passing through the centers of said reels.

3. A magnetic recording tape cassette as defined in claim 2, in which said engaging means is in the form of a pair of engaging pins fixed to a bottom wall of said casing on opposite sides of said body portion, said pair of engaging pins also serving to guide movement of said body portion between said operative position and said inoperative position.

* * * * *